Oct. 27, 1953

R. DÉTREZ 2,656,964

MACHINE FOR SUCCESSIVELY PERFORMING OPERATIONS
ON VESSELS OR OTHER ARTICLES

Filed Aug. 21, 1947

INVENTOR:
René Detrez
by Michael S. Striker
his agent

Patented Oct. 27, 1953

2,656,964

UNITED STATES PATENT OFFICE 2,656,964

MACHINE FOR SUCCESSIVELY PERFORMING OPERATIONS ON VESSELS OR OTHER ARTICLES

René Dètrez, Nogent-sur-Marne, France

Application August 21, 1947, Serial No. 769,844
In France August 25, 1945

Section 1, Public Law 690, August 8, 1946
Patent expires August 25, 1965

9 Claims. (Cl. 226—75)

This invention relates to machines or apparatus effecting multiple operations on bottles, flasks, jars or other receptacles or objects, such as: filling, corking, mounting, labelling, etc., as, for example, the machine forming the object of French patent application No. 792,882 dated July 24, 1935.

It has reference to machines in which the objects to be treated are carried upon a rotary platform, as well as to those in which the said objects are carried by a chain, in a horizontal plane.

In these machines it may be desirable that the platform or chain transporting the objects to be treated should be provided with supports adapted not only to participate in the rotary movement of the platform, or the transfer movement of the chain, which carries them, but which are adapted moreover to receive, whilst supporting the objects to be treated, several raising-and-lowering movements created successively by apparatus independent of the platform or chain in question, and corresponding to the different operations to be carried out on the objects in question.

Assuming that these different operations require raising-and-lowering movements of different amplitude, speed and force according to the operations to be carried out, it may also be desirable that each of the supports for the bottles or objects should be raised and lowered with a different stroke and that the lifting force of each of the said supports should also be different. It may even be desirable that certain supports should make a raising-and-lowering movement and that others should not.

It is accordingly one of the objects of the present invention to provide a machine which is capable of performing widely different operations on bottles, or the like, at different stations.

A further object of the present invention is to provide an apparatus which guarantees the downward as well as the upward movement of the articles being operated on.

Yet another object of the present invention is to provide a machine with independent structures for moving the articles at the various stations where the operations are performed.

Still another object of the present invention is to provide a machine of the above type where the article moving means for moving the articles at the operation stations are independent of the conveyor means for moving the articles between the stations.

An additional object of the present invention is to provide a machine of the above type where a plurality of moving means which are independent of the conveyor means are also independent of each other.

In order that the invention may be better understood, the said invention is hereinafter described and shown diagrammatically in the accompanying drawings which show at the same time, as examples of its application both to the combination of sliding supports disposed on a rotary platform with apparatus for imparting raising-and-lowering movement independent of this platform, and to the combination of such supports disposed on a chain having a horizontal transfer with apparatus for imparting a raising-and-lowering movement also independent of the said chain, in which drawings:

Fig. 1 is a plan of a multiple machine, showing its rotary platform carrying sliding supports with their bottles, the said supports participating in the rotary movement of the platform in question: working stations being disposed at fixed stations around the said rotary platform.

Fig. 2 is an elevation, in section, of the machine shown in Figure 1, showing the sliding supports participating in the rotary movement of the rotary platform, also fixed apparatus, for imparting raising-and-lowering movement, connected temporarily to the supports for the bottles in question, the raising and lowering means for station 3 of Fig. 1 being displaced through 90° and appearing at the right-hand side of Fig. 2.

Figure 1:
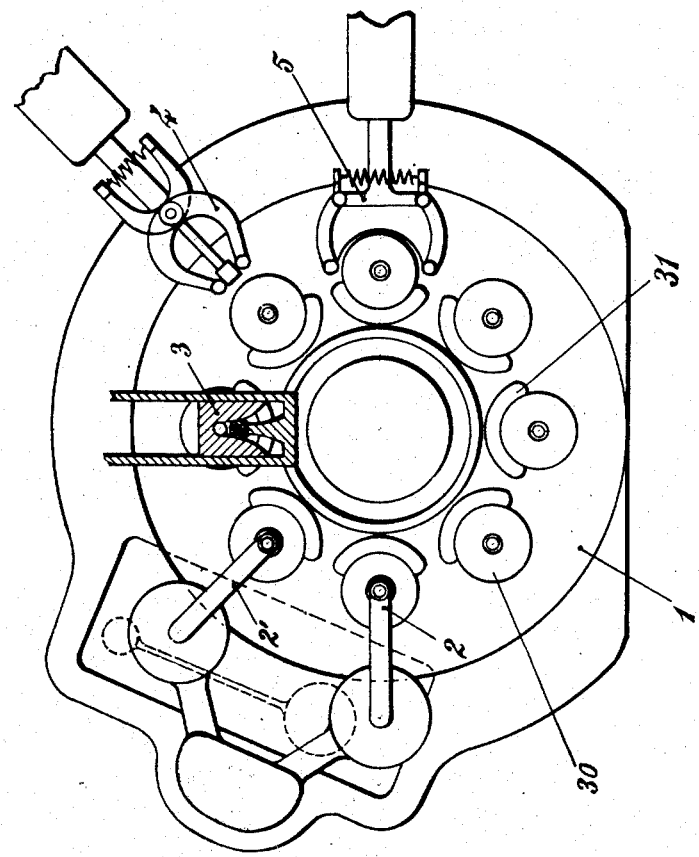

In Figure 1, I is the rotary bottle-carrying platform; 2, 2¹, 3, 4 and 5 are work stations each effecting an operation on a bottle, such as respectively: the filling (2 and 2¹), the corking (3), the application of a label (4) and the smoothing of the said label (5).

As may be well understood these work stations could be used for other purposes, and could be any number.

Figure 2:
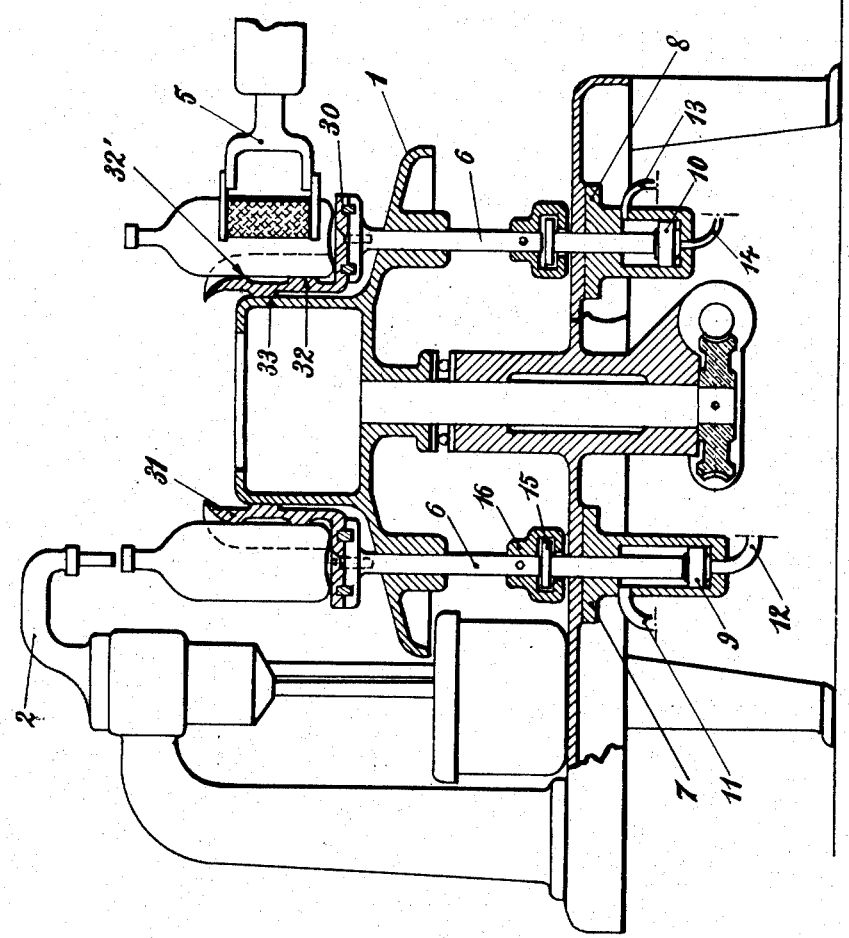

In Figure 2, 6 are sliding supports, 7 and 8 are independent actuating means for imparting raising-and-lowering movement. However, it should be noted that the apparatus 8 is not that which corresponds to the label smoothing stage 5, opposite which it is shown. This apparatus for imparting raising-and-lowering movement is that for the corking station 3; it has been displaced through 90° to the right to show that each raising-and-lowering apparatus may have characteristics different from the other raising-and-lowering apparatus, both in its stroke, and in its speed of operation and in the pressure which it is adapted to impart to the sliding support which it is adapted to operate.

It will be seen that the stroke of the raising-and-lowering apparatus 7 is longer than that of the raising-and-lowering apparatus 8, that the piston 10 of the latter is of larger diameter than that of the former, thus permitting of the supporting and raising of the bottle with a greater force.

Similarly, the section of the conduits 11 and 12 supplying liquid under pressure is greater in the raising-and-lowering apparatus 7 than the section of the conduits 13 and 14 feeding the raising-and-lowering apparatus 8, which enables the bottles to be raised and lowered more quickly at the station 2, and enables the maximum time to be reserved for the filling operation during the period of rest of the rotary platform 1.

In the case of the station 5, there is no need for any raising-and-lowering apparatus and it is the same, in principle, for the other stations at which the operation carried out on the bottle is performed on the latter transversely.

In the case of the application of the invention shown in these Figures 1 and 2, the operation is as follows:

The rotary platform 1 has an intermittent rotary movement. At each period of rest of this platform, one of the sliding supports 6 is presented successively opposite the working stations 2, 2¹, 3, 4 and 5 and above a raising-and-lowering apparatus 7 for the first filling operation, the raising-and-lowering apparatus 8 for the corking operation, and also other necessary raising-and-lowering apparatus not shown.

During the period of rest of the platform 1, a distributor transmits liquid under pressure to the underside of the piston 9, and immediately the sliding support 6, pushed by the piston, is raised, taking the bottle to be filled against its filling nozzle in order to submit it to this operation. It being assumed that the said operation has been carried out, the distributor will send the liquid under pressure on to the opposite face of the piston 9 and the latter will descend, removing with it the sliding support 6 to which it is temporarily connected.

This temporary connection is made when the enlarged head 15 of the piston 9 becomes surrounded on opposite sides by the hook-like connecting member 16 to remain therein while the platform 1 is at rest, and it is broken only when the rotary, intermittently moving platform again turns to locate the articles to be treated at the succeeding stations. At this moment the sliding support 6 will be located opposite a second filling nozzle 2¹ (which may be, for example, a finishing nozzle, the first aiming only at partially filling the bottle), and a second raising-and-lowering apparatus which subjects it to the same sequence of operations as during the first operation.

Another step of the rotary platform takes the said sliding support 6 opposite the corking station 3 and above the raising-and-lowering apparatus 8 which, as has already been explained, is the one corresponding to this station. For the reasons indicated at the beginning of this description, this raising-and-lowering apparatus has different characteristics from those of the apparatus at the filling station.

In the example illustrated there has been shown in diagram form, a station for corking by means of corks, for which the raising pressure of the bottle at the moment of corking is of relatively small importance. If it should be desired to cork by means of crown caps or the like, which necessitates a pressure on bottle in the order of 250 to 300 kilograms, the raising-and-lowering apparatus would be set up accordingly.

As may be well understood, each sliding support passes successively above each raising-and-lowering apparatus and is successively temporarily connected with each of these members.

Certain work stations have no need to be united with a raising-and-lowering apparatus. In this case, there is no raising-and-lowering apparatus at these stations. It is these conditions which exist, in principle, at the stations 4, for applying the label, and 5, for smoothing the said label, at which the operation on the bottle or other object is no longer effected in the longitudinal direction but in the transverse direction.

However, in the operation of applying a label, a tablet with figures in relief, or a stamp on the body or on any other part of the bottle, it may be desirable that this label, tablet or stamp should be located on the bottle at a predetermined distance below the neck of the latter. The invention enables these conditions to be fulfilled by the apparatus shown in Figure 4.

Figure 3:
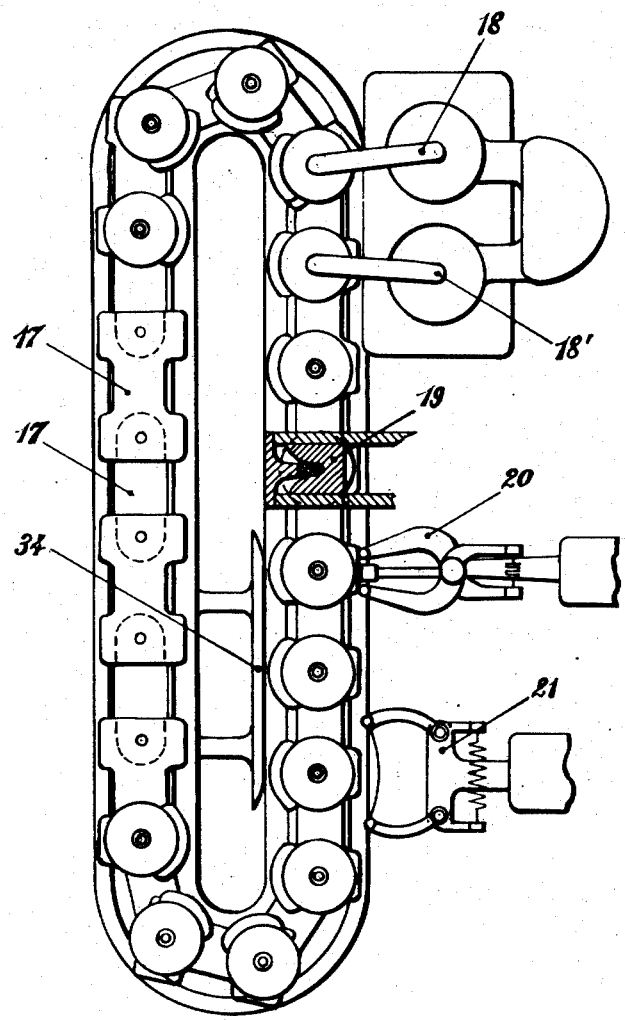
Fig. 3 is a plan showing a multiple machine comprising a chain, having a horizontal transfer movement, carrying sliding supports like those in Figure 1, the work stations of the machine shown being disposed at fixed stations along the chain in question.

In Figure 3, 17 is the chain having a horizontal transfer movement; 18, 18¹, 19, 20 and 21 are the work stations each performing an operation on the bottle, it may be respectively: 18 and 18¹, the filling, 19 the corking, 20 the application of the label and 21 the smoothing of this label.

Figure 4:
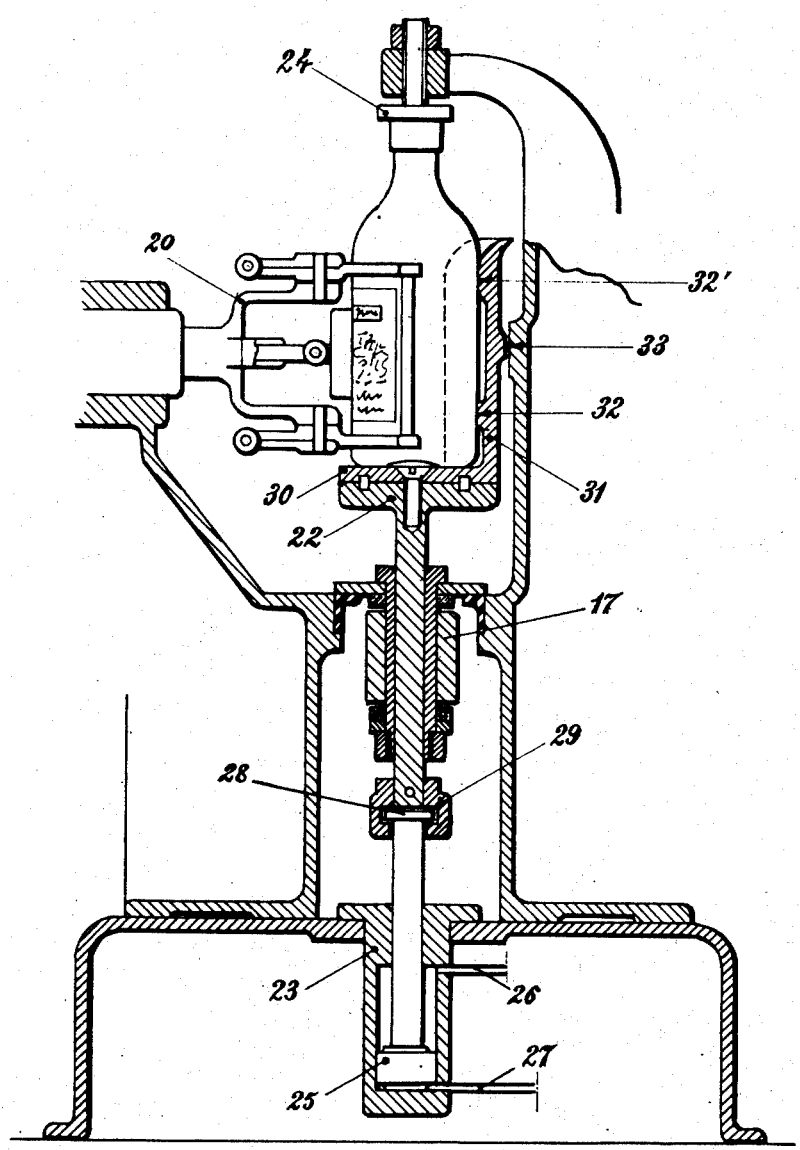
Fig. 4 is an elevation, in section, of a part, showing a sliding support participating in the transfer movement of the chain of Fig. 3, as well as the apparatus for imparting raising-and-lowering movement connected temporarily to this support.

In Figure 4, 22 is the sliding support. The sliding supports are carried by the chain and slide vertically: either directly in pivot pins of the latter, which are hollow (as in the example shown), or in hollow bearings rigid with the links of the said chain. 23 is the raisin-and-lowering apparatus of the station 20, which is utilised in this particular example for raising the bottle against an abutment 24, in a manner such that the label may be positioned on the bottles constantly at the same depth below the neck, even if the bottles are of irregular height.

This method of positioning the label on the bottle by means of a sliding support for the bottle, connected temporarily to a raising-and-lowering apparatus, may also be used when labeling a small series of bottles or other objects with labels placed at different heights, so as to avoid adjustments of the label box and of the glue applicators which take substantially longer and are more delicate than the adjustment of a simple abutment such as the abutment 24.

In this Figure 4, 25 is the piston of the raising-and-lowering apparatus 23, 26 and 27 are the conduits supplying liquid under pressure to this raising-and-lowering apparatus 23.

In the case of the application of the invention illustrated in these Figures 3 and 4, the operation is the same as in the example illustrated by Figures 1 and 2, except that the displacement of the sliding supports in relation to the raisingand-lowering apparatus, is effected in a rectilinear manner instead of in a circular manner.

This operation is as follows: the chain 17 is given a horizontal transfer movement, preferably intermittent. During each period of rest of this chain one of the sliding supports 22 which it carries, is presented successively opposite the work stations 18, 18¹, 19, 20 and 21 and above raising-and-lowering apparatus of the same construction as that of Figure 4 and those of Figure 2.

During the period of rest of the chain 17, a distributor (not shown) sends liquid under pressure to the underside of the pistons of the raising-and-lowering apparatus to be operated, in the same manner as in the case of Figures 1 and 2. Supposing that the operations have been performed, the pistons of the raising-and-lowering apparatus are driven in the reverse direction also as in the above example.

The temporary connection between the sliding supports carried by the chain 17 and the raising-and-lowering apparatus is effected as in the first example, when the enlarged head 28 of the piston 25 becomes surrounded on opposite sides by the hook-like connecting member 29.

The hook-like members 16 and 29 each include a pair of downwardly extending elongated free grooved portions which are substantially parellel to each other and which are arranged with the grooves thereof directed toward each other, as is apparent from Figures 2 and 4. With the embodiment of Figure 2, the heads 15 at the tops of the piston rods are located at the same elevation as the areas between the grooved portions of hook-like connecting members 16, and moreover these head members 15 are located at the same radial distance from the turning axis of the table 1 as the hook-like connecting members 16. Therefore, as each of these hook-like connecting members 16 becomes located at an operating station, the opposite grooved portions thereof move along a head 15 to become located about opposite sides thereof, as shown in Figure 2. Therefore, when the pistons 9 and 10 are reciprocated while the table 1 remains stationary the pistons will not only transmit their upward movement to the vertically sliding supports 6, but also the pistons will positively pull these sliding supports downwardly. The hook-like connecting members 29 cooperate in the same way with the head members 28 in that they move along these head members to surround opposite sides thereof as shown in Fig. 4 so that both upward and downward movement of the pistons 25 will be communicated to the vertically sliding supports 22. When the movement of the conveyer 1 or 17 is again started to carry the articles to be treated to the next station, the hook-like connecting members 16 or 29 simply move away from the head members.

In the particular instance of Figure 4, where the raising-and-lowering apparatus is used as the means for positioning in height one or more labels on a bottle, the distributor (not shown) sends the liquid under pressure to the underside of the piston 25 and immediately the sliding support 22 rises, pushed by the piston 25, moving the neck of the bottle carried by the support in question against the abutment 24, which is capable of being adjusted.

It will be noticed that both in the example of Figures 1 and 2 and in that of Figures 3 and 4, the sliding supports are surmounted by a seat 30 with a back 31 carrying the bottle or the object to be treated, and that this seat is removable. This enables the said seats to be suited to the shape and dimensions of the said objects, whether these objects be round, square, tall, short or otherwise.

It will also be noticed that the back 31 comprises bearing points 32, 32¹, and 33 on its internal and external walls, these points receiving at the appropriate times the transverse pressure imparted to the bottle by the labelling members 4 and 5 or 20 and 21. These bearing points prevent the bottles from recoiling and receiving a shock under the action of the labelling members in question. In the case of fragile bottles the said bearing points may be made of rubber or similar material.

Although intermittent movement is preferred, the invention is also applicable both to rotary platforms with continuous movement and to chains having a continuous horizontal transfer movement.

In this case, the operation of the raising-and-lowering movement can be effected: either during the temporary connection with the corresponding sliding supports, the latter being displaced horizontally when in connection with the raising-and-lowering apparatus (as a consequence of the rotary movement of the platform or the transfer movement of the chain); or by imparting to the raising-and-lowering apparatus a temporary and periodic to-and-fro movement in a horizontal plane with the object of temporarily and periodically accompanying each of the sliding supports during the operations to be performed.

It is to be understood that all modifications and employments of equivalent means could be adopted in carrying out the invention without departing from the governing spirit. Thus in the examples hydraulic raising-and-lowering movements have been illustrated; but the invention could be carried out with these movements effected mechanically, the latter being synchronised with the hydraulic movements.

I claim:

1. A machine for processing articles comprising, in combination, conveyer means for carrying to a plurality of consecutive stations arranged along a predetermined path a plurality of articles arranged on the said conveyer means in the direction of said path; a plurality of article supports mounted on said conveyer means for movement in a direction transverse to said path; a plurality of cylinders respectively located at said stations and being mounted with their axes extending in a direction transverse to said path; a plurality of pistons mounted respectively in said cylinders for movement in a direction transverse to said path; a plurality of piston rods respectively connected to said pistons on the side thereof adjacent to said article supports; a plurality of head members respectively mounted on the ends of said piston rods which are adjacent to said article supports; a plurality of hook means respectively located on said article supports adjacent to said head members for engaging the head members when the article supports are located at said stations, whereby the article supports, when they are located at said stations, are positively connected to said piston rods; and independent hydraulic actuating means connected with each of said cylinders for moving said pistons to different extents and at different rates so that articles on said article supports are also moved to different extents and at different rates at the respective stations.

2. A machine for processing articles comprising, in combination, intermittently movable conveyer means for carrying to a plurality of consecutive stations arranged along a predetermined path a plurality of articles arranged on the said conveyer means in the direction of said path; a plurality of article supports mounted on said conveyer means for movement in a direction transverse to said path; a plurality of cylinders respectively located at said stations and being mounted with their axes extending in a direction transverse to said path; a plurality of pistons mounted respectively in said cylinders for movement in a direction transverse to said path; a plurality of piston rods respectively connected to said pistons on the side thereof adjacent to said article supports; a plurality of head members respectively mounted on the ends of said piston rods which are adjacent to said article supports; a plurality of hook means respectively located on said article supports adjacent to said head members for engaging the head members when the article supports are located at said stations, whereby the article supports, when they are located at said stations, are positively connected to said piston rods; and independent hydraulic actuating means connected with each of said cylinders for moving said pistons, while the conveyer means is at a standstill, to different extents and at different rates so that articles on said article supports are also moved to different extents and at different rates at the respective stations.

3. A machine for successively performing operations on vessels or the like, comprising, in combination, a stationary support; a table turnably mounted on said support for rotation about a vertical axis; a plurality of operating units mounted on said support and being located about said axis and over the peripheral portion of said table, said operating units being equidistant from said axis and each other; a plurality of carriers, for vessels or the like, mounted on said table adjacent to the periphery thereof and being equidistant from each other and said axis, each of said carriers having a top end located over said table and provided with a seat for a vessel or the like and having a bottom end located beneath said table, each of said carriers intermediate of said ends thereof being mounted on said table for reciprocating movement in a direction substantially parallel to said vertical axis; a plurality of stationary lifting and lowering means located on said support beneath said table and respectively aligned with said plurality of operating units, said plurality of lifting and lowering means being arranged opposite the path through which said bottom ends of said carriers pass and each having a top end located adjacent to said path; and connecting means mounted on each of said top ends of said lifting and lowering means and on each of said bottom ends of said carriers for temporarily and periodically connecting each of said lifting and lowering means successively to each of said carriers when said bottom ends thereof are respectively located over said top ends of said plurality of lifting and lowering means.

4. A machine as defined in claim 3 and wherein said carriers, intermediate said ends thereof, are slidably mounted on said table for reciprocating movement in a direction substantially parallel to said vertical axis.

5. A machine as defined in claim 4 and wherein a moving means is connected with said table for intermittently turning the same about said axis to successively locate vessels, and the like, on said carriers at said operating units, and wherein an actuating means is connected with each of said lifting and lowering means to actuate the same only during periods when said table is at a standstill.

6. A machine as defined in claim 5 and wherein each of said lifting and lowering means is hydraulically operated and entirely independent of said table.

7. A machine for successively performing operations on vessels or the like, comprising, in combination, a horizontal conveyor chain adapted to move along a predetermined path, a plurality of stationary operating units located above said conveyor chain and being arranged along the length thereof adjacent to said path; a plurality of carriers, for vessels or the like, each of said carriers having an intermediate part slidably mounted for reciprocating movement through one of the links of said chain in a substantially vertical direction, each of said carriers having a top end located above said chain and provided with a seat for a vessel or the like and a bottom end located below said chain; a plurality of stationary lifting and lowering means respectively located in a vertical alignment with said operating units and being located beneath said chain, each of said lifting and lowering means having a top end movable toward and away from said chain; and a connecting means mounted on each of said top ends of said lifting and lowering means and on each of said bottom ends of said carriers for successively and temporarily connecting each of said top ends of said lifting and lowering means to said bottom ends of said carriers.

8. A machine as defined in claim 7 and wherein a moving means is connected to said chain for intermittently moving the same to successively locate a vessel or the like on a carrier in alignment with said operating units, and wherein an actuating means is connected with each of said lifting and lowering means for actuating the same only during periods when said chain is at a standstill.

9. A machine as defined in claim 7 and wherein each of said lifting and lowering means is hydraulically operated.

RENÉ DÈTREZ.

References Cited in the file of this patent

UNITED STATES PATENTS

| Number | Name | Date |
|---|---|---|
| 582,988 | Hoyte et al. | May 18, 1897 |
| 644,761 | Bowen | Mar. 6, 1900 |
| 1,024,493 | Baroody | Apr. 30, 1912 |
| 1,043,066 | Chilton | Nov. 5, 1912 |
| 1,966,889 | Fagan et al. | July 17, 1934 |
| 2,314,918 | Baule | Mar. 30, 1943 |
| 2,383,781 | Dorrell | Aug. 28, 1945 |

FOREIGN PATENTS

| Number | Country | Date |
|---|---|---|
| 369,476 | Germany | Feb. 19, 1923 |